July 2, 1957 R. W. SABOL 2,798,120

PHONOGRAPH PICKUPS

Filed April 10, 1952 2 Sheets-Sheet 1

INVENTOR.
R.W. SABOL

BY

Greene, Pineles & Durr
ATTORNEYS

July 2, 1957 R. W. SABOL 2,798,120

PHONOGRAPH PICKUPS

Filed April 10, 1952 2 Sheets-Sheet 2

INVENTOR.
R. W. SABOL

BY Greene, Pineles & Durr
ATTORNEYS 2,798,120
Patented July 2, 1957

2,798,120

PHONOGRAPH PICKUPS

Richard W. Sabol, Thornwood, N. Y., assignor to Sonotone Corporation, Elmsford, N. Y., a corporation of New York Application April 10, 1952, Serial No. 281,609
4 Claims. (Cl. 179—100.41)

This invention relates to phonograph pickups, and more particularly to phonograph pickups which are utilized for transducing undulations of record traces, usually in the form of an undulating record groove, into corresponding electric signal waves.

All generally used phonograph pickups have a mechano-electric transducer which is driven by a stylus engaging the moving record trace of the record disc or the like for translating the undulations of the record trace into corresponding electric signals. The stylus is usually carried on the forward end of a transducer drive-rod which transmits the undulations of the stylus to the transducer.

Although the present invention was evolved in connection with phonograph pickups intended for use with laterally-cut record groove traces generally used in making conventional phonograph records, and specific exemplifications of such pickups will be herein described, the principles of the invention are also applicable for pickups designed for use with vertically-cut record grooves.

To satisfy the demand for pickups provided with two styli having different tips for selective use with relatively wide and deep record grooves or with relatively narrow and shallow record grooves, there have come into use turnover pickups with two oppositely directed styli, the pickup with its two styli being arranged for rotation over an angle 180° for selectively bringing in one or the other of the two differently tipped styli into scanning engagement with a record groove. However, such prior art turnover pickups are of complicated construction and have various other disadvantages. Accordingly, most of the generally used phonograph pickups intended for operation with record grooves of different depth are equipped with a single stylus, the tip of which is given a special configuration, which is a compromise between the configuration required for scanning with the best efficiency record groove of small depth and width with that required for scanning with best efficiency record grooves of relatively large depth and width.

In the co-pending application Serial No. 212,130, filed February 21, 1951, of H. F. Klingener there is disclosed and claimed a novel turnover pickup wherein a relatively fixed transducer structure of the type used with single-stylus pickups, is combined with a stylus drive-rod coupled thereto and arranged for independent rotation or turning about its axis for bringing either one of its two styli to the groove tracing stylus position.

Among the objects of the invention is such phonograph pickup having a relatively fixed transducer structure driven by such independently turnable two-styli drive-rod, and wherein the mounting portions through which the stylus drive rod is joined to the transducer structure embodies biasing means which cause the stylus drive rod to be automatically brought to either one of its two stylus positions whenever it is partially turned toward it past an intermediate position.

The foregoing and other objects of the invention would be best understood from the following description of exemplifications thereof, reference being had to the accompanying drawings, wherein.

Although the phonograph pickups of the present invention may be operated with any of the known types of mechano-electric transducer structures—including these utilizing magnetic structures, electrical resistance elements and piezoelectric structures for converting mechanical strains or motions into electric signals—the present invention will be described in connection with a pickup utilizing a piezoelectric transducer of the type disclosed in the co-pending applications Serial No. 727,152, filed February 7, 1947, and Serial No. 772,934, filed September 9, 1947, assigned to the assignee of the present application.

Figure 2:
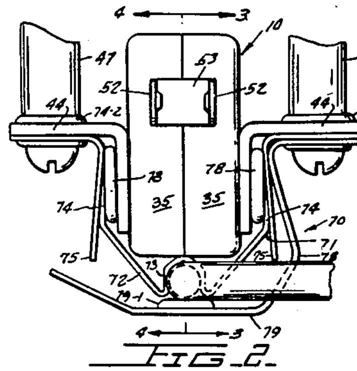
Fig. 2 is a rear end view of the pickup shown in Fig. 1.
Figure 1:
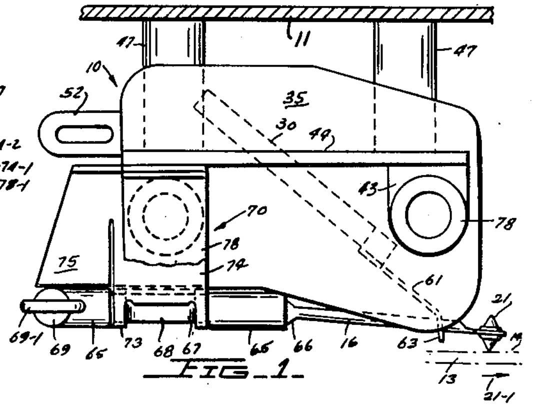
Fig. 1 is a side elevational view of one form of a phonograph pickup of the invention with one of its styli in a record groove scanning position.

Figs. 1 to 6 show one form of a pickup 10 exemplifying the invention. Fig. 1 shows the pickup 10 in its operative position held on the downwardly facing side of the front end of a tone-arm 11 with one of its two styli 21 engaging a record groove trace 14 of a conventional record disc 13. The record disc 13 is arranged to rotate in a conventional way in clockwise direction around a generally vertical axis and the individual spiral record traces 14 of the disc 13 are of substantially circular shape. The tone-arm 11 has a rear end, not shown, which is mounted in a conventional way so as to rotate around a vertical axis and also for upward tilting. Fig. 1 is intended to show the downward stylus 21 engaging a groove portion 14 of the clockwise rotating disc 13 moving in a forward record playing direction indicated by arrow line 21–1, which is substantially tangential to the circular record groove engaged by the stylus. The axial direction of the longitudinal stylus drive rod 16 extends substantially in a vertical plane through the forward playing direction 21–1 of the record groove, in generally the same direction.

In the particular phonograph shown in Fig. 1, the record trace 14 is formed of a laterally-cut record groove which imparts to the pickup stylus 21 a lateral undulatory motion, but as explained before, the pickup 10 of the invention shown may be designed for operation with a vertically cut record groove.

The pickup 10 comprises a mechano-electric transducer generally designated 30, shown formed of two strip-like piezo-electric transducer elements 31 secured to the opposite sides of a metallic backing sheet element 32 (Fig. 5) and forming with it a bilaminate piezoelectric transducer structure which when bent or strained transversely to its length will generate corresponding aiding voltages impressed on the outwardly facing electrode surfaces of the two piezoelectric elements 31.

In the form shown, each of the two piezoelectric elements 31 consists essentially of an electrically polarized thin solid dielectric layer of ceramic titanate material, and two surface electrodes united to the extended opposite outer surfaces of the dielectric layer.

By way of example, each piezoelectric transducer element 31 of the particular pickup shown may have a dielectric layer consisting essentially of barium titanate having a thickness of about 0.010 inch. The width of the dielectric layer and of the backing sheet may be .070 inch. The length of the transducer 30 may be .550 inch. The metallic strip may be about 0.005 inch thick.

The lever-like piezoelectric transducer 30 is retained in operative position between two elastomer pads 33 of a plasticized elastomer substance (Figs. 3, 4) and arranged to exert on the transducer elements 31 elastically compliant reaction forces resisting their displacement so as to cause them to generate electric signal voltages corresponding to the undulatory strains or motion imparted to a forward drive end 34 of the transducer 30.

The two elastomer pads 33 are held in their proper operative position by a housing structure consisting of two housing walls 35 suitably secured to each other as by screws or hollow rivets 41 shown.

In the form shown, the two casing walls 35 are of substantially rigid, molded, insulating material. The inwardly facing sides of the two housing walls 35 are provided with elongated recesses providing an elongated compartment 36 of greater width than the transducer structure 30 and for holding therein the two elastomer pads 33 in their operative position.

Extended parts of the inwardly facing sides of the two casing walls 35 are held clamped to each other in abutting relation by the fastening rivets 41. The transducer compartment 36 is open at its front end 37 in which the drive-end portion 34 of the transducer structure 30 is positioned. To prevent turning or movement of the elongated lever-like transducer structure 30 in a vertical plane, an additional elastomer pad 38 of similar material is retained clamped between the opposite compartment walls of the two casing walls 35 so that its downwardly facing side engages an upwardly facing edge region of an intermediate part of the transducer 30, thereby restraining its movement in an upward direction.

The fastening rivets 41 also hold fastened against the outer sides of the two casing walls 35 of the pickup mounting brackets 43 having horizontal arms 44 with holes for receiving screws by means of which the pickup is secured to mounting bosses 47 provided on the downwardly facing side of the forward part of the tone-arm 11.

Within recessed inwardly facing portions along the rear region of the two casing walls 35, along their rear end, are retained two terminal members 51 provided with outwardly projecting terminal prongs 52. The terminal members 51 are made of a relatively firm strip of metal, such as brass, and they are retained in their clamped position between the two housing walls by a compressed elastic insulating member 53, such as rubber, interposed therebetween (Figs. 2, 3, 3A, 4).

Figure 3A:
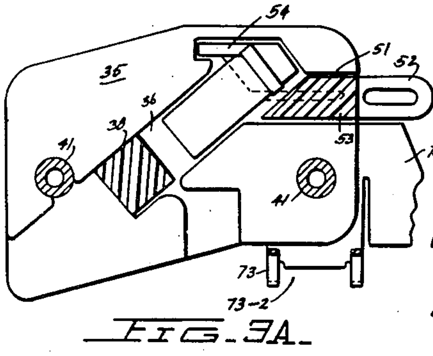
Fig. 3A is a partial cross-sectional view along line 4—4 of Fig. 2 showing the pickup with the stylus drive-rod and transducing member removed.
Figure 3:
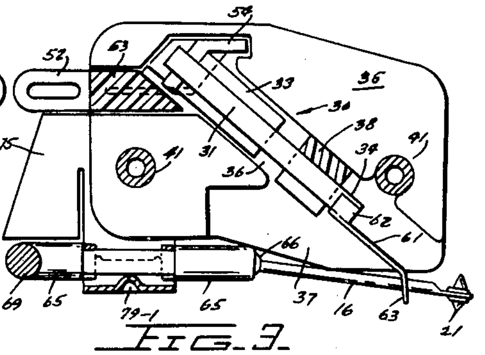
Fig. 3 is a partial cross-sectional view along line 3—3 of Fig. 2.
Figure 4:
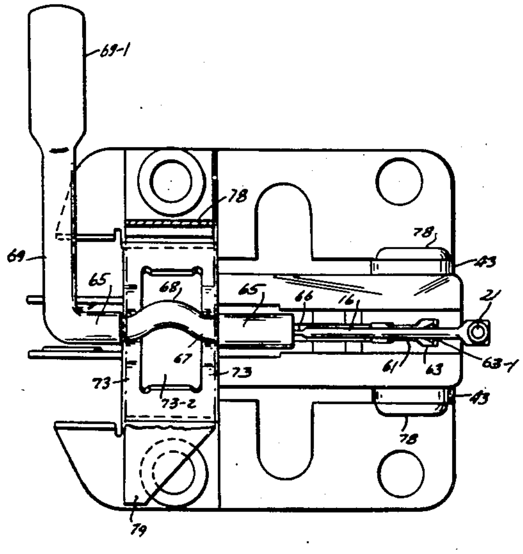
Fig. 4 is a bottom view of the pickup shown in Fig. 1.
Figure 5:
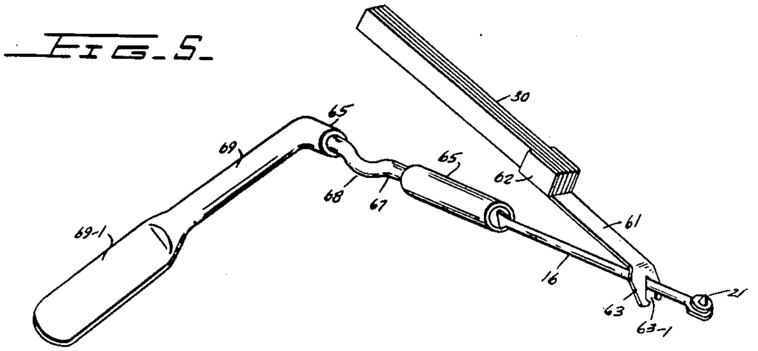
Fig. 5 shows the operative relationship of the fixed transducer of member 30, the turnover stylus drive-rod arranged for detachable coupling connection thereto.

The inner end of each relatively firm terminal member 51 is provided with a relatively flexible spring-like tail portion 54 folded in the way indicated in Figs. 3, 3A and 4, over the rear region of the adjacent elastomer pad 33 and held pressed thereby into contact engagement with the adjacent outer electrode surface portion of the piezoelectric element 31 of the transducer structure 30. In this manner, the two external terminal projections 52 provide opposite polarity terminal connections to the outer electrode surfaces of the piezoelectric transducer structure 30.

A forward drive portion 34 of the lever-like piezoelectric transducer 30 (Fig. 3) is drivingly coupled to the stylus drive-rod member 16, the forward end of which carries the two oppositely projecting styli 21. In the form shown, the forward drive portion 34 of the piezoelectric transducer 30 has secured thereto an elongated drive extension 61 extending downwardly and forwardly into the open front end 37 of the transducer compartment 36 and shown projecting beyond the lower boundary of the forward part of the two casing walls 35.

The drive extension 61 is shown formed of a relatively stiff sheet metal strip provided at its rear with two ears 62 bent into U-shaped formation which is insulatingly affixed, as by a suitable insulating cement, to the forward drive portion 34 of the transducer 30 so as to form a fixed drive extension thereof. The elongated downwardly and forwardly projecting tongue-like drive extension 61 is provided at its front end with a coupling end 63 having a recess or perforation 63–1 serving as a coupling seat for receiving therein, and detachably holding in coupling driving engagement, the forward region of the stylus drive-rod 16 extending with its longitudinal axis lengthwise below the bottom center region of the pickup housing walls 35.

The relatively long drive extension 61 of the transducer 30 is designated to be relatively flexible in the direction of a vertical plane through its longitudinal axis so as to prevent the transmission of undesirable vertical motion but to have sufficient lateral stiffness for transmitting to the transducer 30 the lateral forces exerted on the stylus 21 by the lateral undulations of the record groove. If the pickup of the type shown is intended for use with a vertically undulating record groove, the drive extension 61 will be given the greater flexibility in a lateral direction and relatively greater stiffness in a vertical direction.

The stylus drive-rod 16 may be formed of a solid or tubular strip of metal and has secured to its front end the two oppositely projecting styli 21. The two styli 21 may form part of a single stylus structure having oppositely directed pointed stylus tips. Alternatively, the two styli 21 may form independent stylus units, each held anchored within a mounting collar affixed within a perforation or forming a fixed part of the forward end of the stylus drive-rod 16.

The pickup shown in Figs. 1 to 6, being intended for use with a laterally undulating record groove trace has a stylus drive-rod 16 designed to be relatively flexible in the direction of a vertical plane through its longitudinal axis so as to bias the stylus with only very slight pressure forces, such as about 5 grams, toward the scanned record groove.

The vertically compliant, stylus drive-rod 16 in cooperation with the likewise vertically compliant, laterally stiff drive extension 61 assure suppression of disturbing undesirable vertical forces that may be transmitted by one of the styli 21 to the transducer structure.

As disclosed and claimed in the Klingener application, the two-stylus drive-rod of a phonograph pickup is arranged to be carried by the pickup structure so that the stylus drive-rod may be independently rotated or turned over an angle of 180° around its axis while the transducer structure driven by the drive-rod remains fixed in its position on the tone-arm.

In the form shown (Figs. 1 to 6), the stylus drive-rod 16 is provided at its rear end with a relatively rigid enlarged generally cylindrical pivot member 65 serving as a mounting portion thereof which is rotatably seated within a rotary guide seat structure generally designated 70 held affixed to the bottom rear part of the pickup casing or housing 35. The rotary guide structure 70 is shown formed of an inner guide structure 71 and a cooperating outer guide structure 78 which provide between them a rotary guide seat arranged to rotatably support and guide the cylindrical pivot member 65 of the stylus drive-rod in an axially fixed position so that it may be turned 180° from one stylus position to the opposite of its two stylus positions.

In the form shown, each of the two rotary guide structures or members 71 and 78 are made of elastic strong sheet metal and they are so shaped and arranged as to permit ready removal and ready replacing of the cylindrical stylus pivot member 65 in its operative position within the guide seat of the pickup, with its stylus drive-rod 16 in detachable operative coupling engagement with the coupling recess 63–1 of the transducer drive extension 63.

The inner guide member 71 of the stylus drive-rod is formed of a generally saddle-like U-shaped sheet structure having an intermediate seating section 72 underlying the rear bottom portion of the pickup housing 35 and provided with a re-entrant groove-like bearing seat 73 arranged to serve as a bearing for the cylindrical stylus pivot member 65. The seating section 72 of the inner guide member 71 is adjoined by the two side arms 74 overlying and secured to the side walls of the pickup casing 35. In the form shown, the side arms 74 are provided with laterally bent fastening plugs 74–1 which are secured, as by hollow rivets 74–2, to the overlying mounting bracket arms 44 of the pickup housing.

The outer guide member 78 is likewise formed of elastic sheet metal and is designed as a cantilever arm structure secured to the pickup housing and having a free arm 79 overlying the bearing seat 73 of the inner guide structure so as to elastically bias and hold positioned therein the cylindrical stylus pivot member 65. side arm overlying the side arm 74 of the inner guide In the form shown, the outer guide member 78 has a member 71, and it has a laterally extending fastening lug 78–1 which is clamped over the similar fastening lug 74–1 of the inner guide member to the overlying mounting bracket arm 44 of the pickup housing by the same common hollow rivet 74–2. The free arm 79 of the outer guide member is designed to permit outward flexing thereof when lifting the stylus pivot member 65 from its bearing seat groove 73 for removing or replacing it in its operative position therein.

The two side arms 74 of the inner guide member 71 are also provided with stop extensions 75 serving as limit stops against which the laterally extending stylus turn grip 69 is brought to a stop when turning the stylus drive-rod 16 over an angle of 180° from one to the opposite of its two stylus positions.

With this arrangement, it is merely necessary to seize the outer end of the stylus turn grip 69 and turn it 180° from one stop 75 against the opposite stop 75, whenever it is desired to bring another of the two opposite styli 21 into a groove scanning position shown in Figs. 1 and 3.

In the form shown (Figs. 1, 2, 4, 6) the stylus pivot member 65 of the stylus drive rod is provided with an intermediate seating section 67 of somewhat reduced diameter arranged to engage the bearing seat 73 of the inner guide member 71. The two adjoining wider cylindrical portions of the stylus pivot member 65 form seat limits engaging the outer edges of the recessed bearing seat grooves 73 of the inner guide member 71 to assure that the stylus pivot member 65 with its stylus drive rod 16 are maintained in an axially fixed position while permitting rotary movement of the stylus pivot member 65 between its two opposite styli positions.

In accordance with a phase of the invention disclosed herein, the stylus pivot member 65 of the turnover stylus is provided with novel biasing means for assuring that whenever the stylus drive rod is turned past its mid position, it will be automatically brought to either one or the other of its two opposite styli positions.

In the form shown, the intermediate stylus pivot seating portion 67 is provided with a laterally projecting or offset bias element 68 shaped and arranged to come into engagement with the overlying portion of the inwardly pressing outer guide member arm 79 so as to cause the eccentric bias element to be turned toward either one or the opposite of its two inner position when it is brought past a mid position while turning the stylus pivot member 65 from one to the opposite of its two styli positions. The bias element 68 is shown provided by an outwardly bent intermediate portion of the intermediate seating section 67 of the stylus pivot member 65. The cooperating bearing seat structure 73 of the inner guide member 71 is provided with a cut-out or recess 73–2 into which the eccentric bias element 68 of the stylus pivot seating section 67 may enter when it is turned inwardly by the overlying inwardly pressing outer arm 79 of the outer seating member 78. In the form shown, the outer guide arm 79 of the guide structure 70 is provided with an inwardly deformed ridge-like bias portion 79–1 which engages the bias element 68 of the stylus pivot member 65 throughout the range of its turning movement from one to the other end position corresponding to the two opposite styli positions.

The wider section of the relatively rigid stylus pivot member 65 is shown formed of a hollow tubing seated over and affixed to a rod portion of smaller diameter forming the intermediate seating portion 67 thereof with its offset eccentric bias element 68. The turn handle grip 69 of the stylus pivot member 65 is formed by a rearwardly bent portion of the wider rear section thereof and its end is flattened to provide a flat end grip portion 69–1.

The forward hollow portion of the stylus pivot member 65 is arranged to hold therein, in a fixed aligned position, the rear end of the stylus drive-rod 16 so that the two styli are always in the proper groove engaging and tracing position when stylus turn grip 69 is brought against either one of its two opposite end stop members 75. In the form shown (Fig. 5), the interior hollow forward portion of the stylus pivot member 65 is filled with a body 66 of elastomer material and the rear end of the stylus drive-rod 16 is flattened and seated within a slit of the elastomer body 66 so that the two styli are in proper axial position relatively to the turn grip 69 of the stylus pivot member 65 to assure that each stylus is in its proper groove tracing position when it is brought to one of its two stylus positions, when the stylus pivot member is turned from one against the other of its two stops 75.

Under normal operating conditions with one of the two opposite styli 21 in a scanning position, the laterally offset bias element 68 of the stylus pivot member 65 is biased to an end position in a generally horizontal plane within the rotary guide seat 73, being held therein by the biasing ridge 79–1 on the outer guide member 79. Whenever it is desired to selectively bring another of the two opposite styli 21 to a groove scanning operative position, it is merely necessary to seize the outer end of the turn grip member 69 and turn it past the mid position. Thereupon, the biasing ridge 79–1 of the outer guide member 78 acting on the biasing element 68 of the stylus pivot member 65 brings it to the other stylus end position.

The foregoing arrangement provides simple but effective means for positively bringing the turnover stylus drive-rod 16 to one or the other of its opposite end positions whenever the stylus drive-rod 16 is turned past the midway point towards the opposite stylus position.

Figure 6:
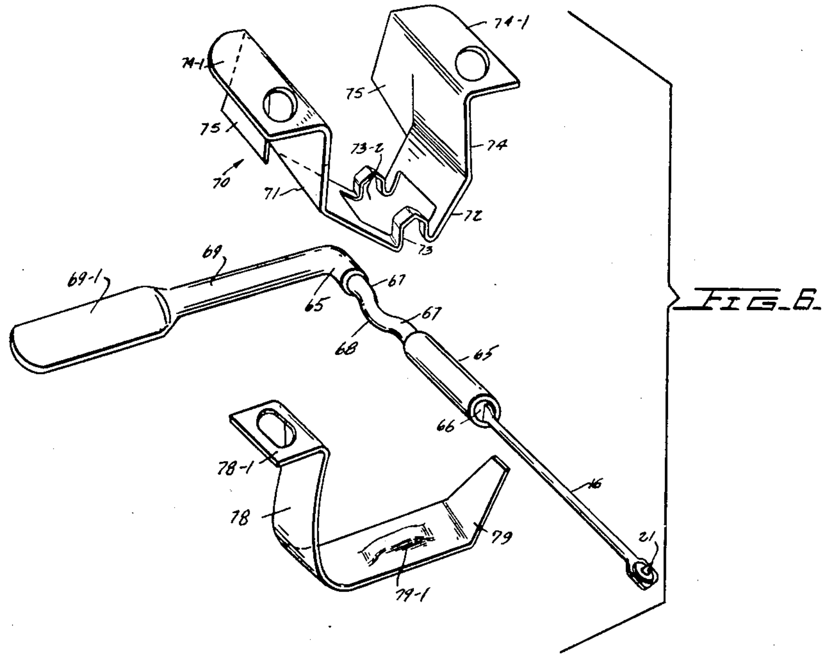
Fig. 6 is an exploded view of the stylus drive-rod and the cooperating mounting elements through which it is operatively held by the pickup casing.
Figure 6A:
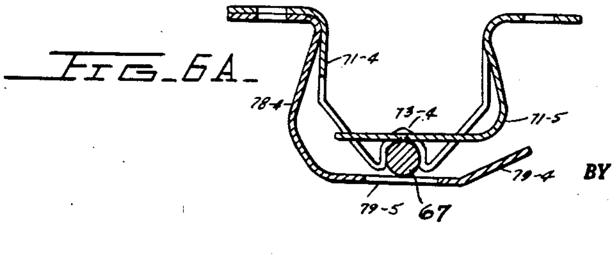
Fig. 6A is a view of a modified form of the mounting elements of such turnable stylus drive-rod.

Fig. 6A shows a modified form of a stylus pivot mounting structure generally similar to that of Figs. 1 to 6, but wherein the inner guide member is provided with a bias element arranged to bring the offset bias element 68 of the turnover stylus pivot member 65 to one or the other of its stylus end positions whenever the stylus pivot member 65 is turned by its turn arm 69 past the mid position. The stylus mounting structure of Fig. 6A has an inner guide member 71–4 and an outer guide member 78–4, each of strong sheet metal and generally similar to the corresponding inner guide member 71 and outer guide member 78 of the mounting structure of Figs. 1 to 6. The inner guide member 71–4 is provided along its intermediate seating section with a re-entrant groove-like bearing seat 73–4 for holding seated therein in an axially fixed but rotatable position the pivot section 67 of the stylus pivot member 65 of the form shown in Figs. 1 to 5, but having a bias element 68–1 offset in a direction opposite to that of Figs. 1 to 6. The stylus pivot section 67 of the similar stylus pivot member 65 has its offset bias element 68–1 arranged to be actuated to one or the opposite end position corresponding to the two opposite styli positions of the stylus drive-rod 16 when the stylus turn handle 69 is turned past the mid position in the same manner as explained in connection with Figs. 1 to 6.

However, in the arrangement of Fig. 6A, an intermediate portion of the inner guide tongue-like arm 71–5 provided on member 71–5 serves as the actuating element acting on the bias element 68–1 of the stylus pivot member 65 for bringing it to one or the other of its two end positions. The tongue-like actuating arm 71–5 is shown formed by partially cutting the inner sheet guide member 71–4 at its intermediate region along lines parallel to its side edges. The tongue-like actuating member 71–4 is bent and shaped in the manner indicated in Fig. 6A so as to elastically bias by its spring action the offset bias element 68–1 of the stylus pivot member 65, so that when it is moved past the mid position—which is towards the top of the bearing seat 73–4 as seen in Fig. 6A—the biasing action of the actuating arm 71–5 will cause it to be moved to its end position, thereby completing the turning movement of the stylus pivot member 65 towards the opposite stylus position. The overlying arm portion 79–4 of the outer guide member 78–4 may be provided with a cut-out 79–5 in the region overlying the bias element 68–1 of the stylus pivot member 65 so as to eliminate any possible interference with the movement of the stylus pivot bias element 68–1 from one to the opposite end position when turning the stylus drive-rod 16 to an opposite stylus position. Otherwise, the stylus drive-rod mounting structure of Fig. 6A is substantially identical with that of Figs. 1 to 6.

The features and principles underlying the invention described above in connection with specific exemplifications, will suggest to those skilled in the art many other modifications thereof. It is accordingly desired that the appended claims shall not be limited to any specific features or details shown and described in connection with the exemplifications thereof.

I claim:

1. A self-supporting stylus drive structure arranged for detachable mounting on a separable mechano electric transducer structure forming part of a phonograph pickup for connection to a driven element of said transducer structure and driving the same, which stylus drive structure comprises an elongated thin drive member carrying at its one end two differently directed styli, a relatively stiff elongated mounting structure coaxial with and flexibly carrying said elongated thin drive member, said mounting structure being thicker than said thin drive member and of a cross-sectional width which is only a small fraction of its length and having a coaxial elongated rotatable seating region and arranged to be rotatably supported adjacent said transducer structure for enabling rotation of said mounting structure and its thin drive member along its said seating region around their common axis and bringing either one of said two styli into a record engaging operative position, said seating region being of smaller cross-sectional area than the two adjoining portions of said mounting structure for fixing the longitudinal position of said stylus drive structure relatively to said transducer structure, a coaxial bias portion of said seating region having an eccentric bias projection turnable past a neutral intermediate position relatively to said transducer structure so that an elastic retaining structure engaging a portion of said mounting structure for retaining it in operative position adjacent said transducer structure will restrainingly engage and move said eccentric bias projections to either one of two end positions and thereby bring either one of said two styli into a groove engaging position when said mounting structure is partially turned toward it past said intermediate position.

2. A self-supporting stylus drive structure as claimed in claim 1, the seating region of said mounting structure being formed of two seating sections separated by its bias portion.

3. In combination with a self-supporting stylus drive structure as claimed in claim 1, of an associated phonograph pickup structure including a transducer structure actuated by said stylus drive member, said pickup structure including a guide structure having an elastic retaining member engaging, retaining and guiding said seating region in its operative position on said pickup structure, portions of said guiding structure engaging portions of said seating region for fixing the longitudinal position of said stylus drive structure relatively to said transducer structure.

4. The combination as claimed in claim 3, the seating region of said mounting structure being formed of two seating sections engaged by said guide structure and separated by the bias portion of said seating region.

References Cited in the file of this patent

UNITED STATES PATENTS

| | | |
|---|---|---|
| 387,732 | Powers | Aug. 14, 1888 |
| 2,103,792 | Peterson et al. | Dec. 28, 1937 |
| 2,479,894 | Andrews | Aug. 23, 1949 |
| 2,518,861 | Burtch | Aug. 15, 1950 |
| 2,548,082 | Tourtellot | Apr. 10, 1951 |
| 2,553,492 | Weil | May 15, 1951 |
| 2,717,929 | Klingener | Sept. 13, 1955 |